United States Patent
Kimoto et al.

(10) Patent No.: US 8,276,975 B2
(45) Date of Patent: Oct. 2, 2012

(54) FRP PANEL FOR AUTOMOBILE

(75) Inventors: Yukitane Kimoto, Matsuyama (JP); Hiroshi Kiyama, Iyo-gun (JP); Shigeru Kawashima, Kyoto (JP); Yuugo Enomoto, Iyo-gun (JP)

(73) Assignee: Toray Industries, Inc. (JP)

( * ) Notice: Subject to any disclaimer, the term of this patent is extended or adjusted under 35 U.S.C. 154(b) by 577 days.

(21) Appl. No.: 10/586,213

(22) PCT Filed: Jan. 21, 2005

(86) PCT No.: PCT/JP2005/000769
§ 371 (c)(1),
(2), (4) Date: Jul. 17, 2006

(87) PCT Pub. No.: WO2005/070747
PCT Pub. Date: Aug. 4, 2005

(65) Prior Publication Data
US 2008/0185874 A1    Aug. 7, 2008

(30) Foreign Application Priority Data

Jan. 23, 2004  (JP) ................................. 2004-15120
Jan. 26, 2004  (JP) ................................. 2004-16818
Jan. 26, 2004  (JP) ................................. 2004-16819
Jan. 29, 2004  (JP) ................................. 2004-21338

(51) Int. Cl.
*B62D 25/10* (2006.01)
*B32B 3/00* (2006.01)

(52) U.S. Cl. ........... 296/187.04; 296/181.2; 296/193.11; 428/36.2

(58) Field of Classification Search ............. 296/193.11, 296/181.2, 187.04, 187.03; 428/292.1, 36.1, 428/36.2
See application file for complete search history.

(56) References Cited

U.S. PATENT DOCUMENTS

| | | | |
|---|---|---|---|
| 4,410,577 A | 10/1983 | Palmer et al. | |
| 7,150,496 B2* | 12/2006 | Fujimoto | 296/187.04 |
| 7,244,501 B2* | 7/2007 | Raghavendran et al. | 428/412 |
| 7,497,507 B2* | 3/2009 | Matsushima et al. | 296/193.11 |

FOREIGN PATENT DOCUMENTS

| | | | |
|---|---|---|---|
| DE | 3908433 | | 9/1989 |
| DE | 10223861 | | 12/2003 |
| EP | 1 336 470 | | 8/2003 |
| JP | 2002-127944 A | | 5/2002 |
| JP | 2002-264846 A | | 9/2002 |
| JP | 2002-284038 A | | 10/2002 |
| JP | 2003-146252 A | | 5/2003 |
| JP | 2003146252 A | * | 5/2003 |
| JP | 2003-311856 A | | 11/2003 |
| JP | 2003311856 A | * | 11/2003 |
| WO | 00/56541 | | 9/2000 |

OTHER PUBLICATIONS

Machine translation of JP 2002-264846A.*

* cited by examiner

*Primary Examiner* — Glenn Dayoan
*Assistant Examiner* — Melissa A Black
(74) *Attorney, Agent, or Firm* — DLA Piper LLP (US)

(57) ABSTRACT

An FRP panel for an automobile, comprising a panel element to which a difference in rigidity and/or a difference in strength is provided between a first FRP layer on a first surface side and a second FRP layer on a second surface side on the opposite side of the first surface. The FRP panel for the automobile having a crushable structure suitable for absorbing impact can be realized, and the impact on a pedestrian in collision can be suppressed by properly absorbing the impact to protect the pedestrian.

12 Claims, 13 Drawing Sheets (A) single plate (B) sandwich structure (C) hollow structure (A) single plate (B) sandwich structure (C) hollow structure (A) single plate (B) sandwich structure (C) hollow structure (A) single plate (B) sandwich structure (C) hollow structure (A) single plate (B) sandwich structure (C) hollow structure (A) single plate (B) sandwich structure (C) hollow structure

FRP PANEL FOR AUTOMOBILE

TECHNICAL FIELD OF THE INVENTION

The present invention relates to an FRP (fiber reinforced plastic) panel for an automobile, and specifically to an FRP panel for an automobile suitable for being used as a bonnet and the like, which can effectively absorb an impact load.

BACKGROUND ART OF THE INVENTION

As a use of an FRP structural body, there is a case where a property capable of absorbing an impact load more effectively is required. For example, in a case where an outer panel for an automobile is formed by an FRP structural body, it is required for the outer panel for an automobile to improve the safety at the time of collision and the like, and in particular, it is required to improve a property for protecting a pedestrian at the time of collision as well as the safety of occupant side when an impactive external force is applied. When an automobile collides with a pedestrian, the pedestrian receives an impact load on the leg or the head against a front portion, a bonnet, etc. of the automobile, and particularly, in order to reduce deadly accidents, it is said that it is inevitable to reduce a damage to the head. Therefore, for a part of an automobile side which is likely to give a damage to the head, particularly for a bonnet, it is required to absorb an impact force as much as possible even at the time of collision accident, thereby suppressing the damage to the head.

In order to provide such an impact absorbing property, it is necessary to suppress the impact force provided to a pedestrian as little as possible while suppressing breakage of parts in an automobile and the damage to an occupant as little as possible, by a condition where the outer panel for an automobile is adequately deformed or broken. Namely, from the viewpoint of protecting a pedestrian, it is necessary to form it as an adequate crushable structure for absorbing the impact.

Although various structures are proposed as an FRP panel for an automobile, the conventional proposals mainly aim to locally increase the strength or the rigidity of a required part (for example, JP-A-2003-146252), there is almost no proposal to form an adequate crushable structure for impact absorption as described above.

Accordingly, changing the viewpoint from the conventional direction for technical development, it could be helpful to provide an FRP panel for an automobile with an adequate crushable structure for impact absorption, in particular, from the viewpoint of protecting a pedestrian, to provide an FRP panel for an automobile capable of suppressing an impact by properly absorbing the impact to a pedestrian at the time of collision.

SUMMARY

We provide an FRP panel for an automobile according to the present invention comprises a panel element to which a difference in rigidity and/or a difference in strength is provided between a first FRP layer on a first surface side and a second FRP layer on a second surface side on the opposite side of the first surface.

In the present invention, the first surface side and the second surface side of the FRP panel for an automobile are defined such that, in a local section of the panel, one side relative to a neutral axis of rigidity is the first surface side, and the other side is the second surface side. The reason why they are thus defined in the "local section" is in that, in a case where the panel is formed as a curved surface structure, because there is a case where the neutral axis of rigidity of the entire panel structure is not positioned in the panel, they are defined in the local section where the neutral axis of rigidity is always positioned in the panel. Further, "a difference in rigidity is provided" means a condition where the neutral axis of rigidity in the above-described local section shifts to any one side from the ½ line of the panel thickness. The "panel element," also characterized as a "panel portion," indicates a part forming an FRP panel for an automobile which satisfies such a property.

In such an FRP panel for an automobile according to the present invention, a structure can be employed wherein the above-described panel element/panel portion is an FRP solid plate which is formed integrally with the first FRP layer and the second FRP layer.

Further, a structure can be employed wherein the above-described panel element is a panel element which has a space between the first FRP layer and the second FRP layer. The structure may be formed either so that this space is left as it is or so that a core material is disposed in the space.

Further, a structure can be employed wherein a plurality of the panel elements are provided, and a space is formed between adjacent panel elements. This structure also may be formed either so that the space is left as it is or so that a core material is disposed in the space.

The above-described difference in rigidity and/or difference in strength can be provided by one or two or more differences selected from the group consisting of a difference in amount of reinforcing fibers, a difference in property of reinforcing fibers and a difference in orientation of reinforcing fibers. For example, a structure can be employed wherein the difference in rigidity is provided by a condition where, with respect to a running direction of the automobile, a main orientation direction of reinforcing fibers of the first FRP layer is in a range of ±20° relative to ±45° disposition, and a main orientation direction of reinforcing fibers of said second FRP layer is in a range of ±20° relative to 0°/90° disposition.

Further, the above-described difference in rigidity can be provided, for example, by a condition where at least one surface of any one of the first and second FRP layers is formed as a surface having a concave/convex shape. For example, this surface having a concave/convex shape can have a planar shape extending almost straightly. Further, it can also be structured wherein a panel plane is sectioned in a lattice-like form into nearly rectangular areas by the concave/convex shape. Further, it can also be structured wherein a panel plane is sectioned in a lattice-like form into nearly diamond-shaped areas by the concave/convex shape. Further, it can also be structured wherein the concave/convex shape is provided along an outer circumferential shape of the FRP panel for an automobile. Furthermore, it can also be structured wherein the concave/convex shape is provided so as to depict a multiple closed curved line with a nearly concentric analog formation on a panel plane.

The above-described difference in strength can be provided, for example, by introducing a discontinuous part of a reinforcing fiber substrate into at least one reinforcing fiber substrate layer of any one of the first and second FRP layers. A structure can be employed wherein a plurality of the discontinuous parts are provided. Further, a structure can also be employed wherein the discontinuous part extends almost straightly. Furthermore, a structure can also be employed wherein the discontinuous part is provided in the interior or on the back surface side of a panel.

Further, the difference in strength can be provided by providing a high breaking elongation layer into any one of the first and second FRP layers. In this case, a structure can be employed wherein the high breaking elongation layer comprises a high breaking elongation resin, and the high breaking elongation resin comprises a thermoplastic resin having a low affinity in adhesion with a matrix resin of the FRP layer. Further, a structure can also be employed wherein the high breaking elongation layer comprises a thermoplastic resin film. In this case, a structure can be employed wherein the high breaking elongation layer comprises, for example, a multi-layer laminated film. Except these structures, it is possible to form the high breaking elongation layer, for example, by a flexible resin or a mesh-like resin net.

Further, the difference in rigidity and/or the difference in strength can be provided by providing a difference in thickness between the first and second FRP layers.

Further, in a case where a core material is interposed between the first and second FRP layers, a structure can be employed wherein a difference in planar rigidity against external force is provided between the first and second FRP layers by providing a difference in hardness between a surface and a back surface of the core material.

In such an FRP panel for an automobile according to the present invention, any one of the surface side and back surface side (the first and second) FRP layers can be formed as a low-rigidity and/or low-strength FRP layer, and this may be decided depending upon the kind of the automobile, a distance between a part to be applied and a mounted object in the inside, a curved shape of an outer panel for an automobile such as a bonnet, etc. For example, with respect to the difference in rigidity, in a case where an impact is intended to be absorbed mainly by a surface side, it is preferred to form a surface-side FRP layer as a low-rigidity FRP layer and to form this surface-side FRP layer in a crushable structure capable of properly absorbing the impact. In this case, because the deformation or the damage of the back surface-side FRP layer can be suppressed to be small, it becomes possible to suppress the influence to the inside mounted object at minimum. On the other hand, in a case where an impact is intended to be absorbed mainly by a back surface side, it is preferred to form a back surface-side FRP layer as a low-rigidity FRP layer and to form this back surface-side FRP layer in a crushable structure capable of properly absorbing the impact. For example, in a case where a distance between the back surface-side FRP layer and an inside mounted object is small, because it is difficult to avoid a collision or a contact between an outer panel for an automobile, which is deformed accompanying with an impact, and the inside mounted object, there is a case where it is preferable to, rather than, injure or break the back surface-side FRP layer so that the back surface-side FRP layer can absorb the impact properly. In such a case, by forming the back surface-side FRP layer at a low rigidity, more effective impact absorption becomes possible.

The part applied with the FRP panel for an automobile according to the present invention is not particularly limited, and it can be applied for a bonnet or a front fender of an automobile. In particular, in a case used for a bonnet of an automobile, it is effective for, particularly, protection of the head of a pedestrian at the time of a collision accident as aforementioned.

In the FRP panel for an automobile according to the present invention, since the difference in rigidity and/or the difference in strength is provided between the first and the second FRP layers, and a crushable structure capable of effectively absorbing an impact at the time of a collision accident and the like is achieved by properly deforming or breaking an FRP layer of low-property side in rigidity and/or strength against the impact, it becomes possible to satisfy the recent requirement for protecting a pedestrian at the time of the collision accident and the like. By this, it can be expected to remarkably reduce the number of the cases such as deadly accidents.

The above-described difference in rigidity and/or difference in strength can be properly provided with a high design freedom by various methods, in accordance with a part to be applied or a purpose for use of the FRP panel. As described above, if the difference in rigidity and/or difference in strength is provided by a difference in amount of reinforcing fibers, a difference in property of reinforcing fibers and a difference in orientation of reinforcing fibers, hardness or easiness of deflection of the panel, further, a direction hard or easy to be deflected of the panel, can be properly set, and it becomes possible to realize a more proper impact absorption structure. Further, if a concave/convex shape is employed for at least one surface of any one of the first and second FRP layers, it becomes possible to absorb the impact more effectively by properly increasing the strength or the rigidity of a necessary portion of the FRP panel or by locally decreasing the strength or the rigidity of the FRP panel and intentionally forming a trigger point of breakage or deformation against impact. Further, if a structure is employed wherein the difference in strength is provided by introducing a discontinuous part of a reinforcing fiber substrate into at least one reinforcing fiber substrate layer of any one of the first and second FRP layers, when an energy of a collision and the like is inputted from outside, the discontinuous part becomes a trigger point of breakage and the FRP plane-like structural part is intentionally broken from the discontinuous part, thereby absorbing the impact energy properly. Further, if a structure providing a high breaking elongation layer is employed, when an energy of a collision and the like is inputted from outside, the high breaking elongation layer absorbs the impact energy more properly by its high breaking elongation property, and even after a lower elongation FRP layer breaks, it is possible that the high breaking elongation layer holds a load, and therefore, it can be avoided that the entire structural body reaches a great breakage state. Furthermore, a proper difference in rigidity or difference in strength can also be provided by providing a difference in thickness between the first and second FRP layers, or in a case interposing a core material, by providing a difference in hardness between its surface part and back surface part.

Figure 1:
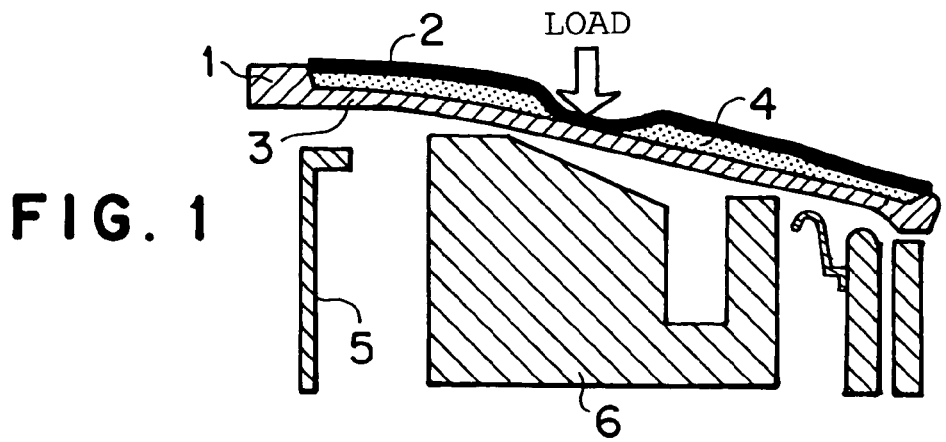
FIG. 1 is a vertical sectional view of an FRP panel for an automobile according to an embodiment of the present invention.

EXPLANATION OF SYMBOLS 1, 11: bonnet as an FRP panel for an automobile
2: first (surface-side) FRP layer (rigidity: small)
3: second (back surface-side) FRP layer (rigidity: large)
4, 14: core material
5: base structural body such as an inside body
6: inside mounted object including an engine and the like
12: first (surface-side) FRP layer (rigidity: large)
13: second (back surface-side) FRP layer (rigidity: small)
21, 31: low-rigidity FRP layer
22, 32: high-rigidity FRP layer
23, 33: core material
34: stiffener
41: low-rigidity surface-side FRP layer
42: high-rigidity back surface-side FRP layer
51, 57, 161, 164, 166: FRP panel for an automobile (bonnet)
52, 53, 58, 59, 62, 63, 83, 84, 88, 89, 94, 95, 99, 100, 106, 107, 111, 112, 118, 119, 123, 124, 130, 131, 135, 136, 142, 143, 147, 148: FRP layer
54, 60, 64, 85, 96, 108, 120, 132, 144: core material
55, 61, 70, 93, 98, 103, 129, 134, 141, 146, 151, 153: concave portion
65, 86, 97, 109, 121, 133, 135: FRP panel for an automobile with a sandwich structure
66, 82, 87, 92, 105, 115, 117, 122, 127, 171: convex portion
67: standard portion
68: reinforcing fiber substrate
69, 81, 92, 104, 116, 128, 140, 152: FRP single plate
71, 154: charged material (filler)
90, 101, 113, 125, 137, 149: hollow portion
91, 102, 114, 126, 138, 150: FRP panel for an automobile with a hollow structure
162, 163, 165: concave portion or convex portion
167: attachment part
170: inside mounted object
181, 186: FRP plate as an FRP panel for an automobile
182: plane-like structural portion
183: reinforcing fiber substrate
183a: reinforcing fiber substrate having a discontinuous portion 184, 185, 191, 192, 194, 196, 198, 202, 203, 205, 208: discontinuous portion
187: surface-side FRP layer
188: back surface-side FRP layer
189: core material
190, 193, 195, 197, 199: FRP panel for an automobile with a sandwich structure
201, 204, 206, 209: FRP panel for an automobile as a bonnet
211: impact load
231, 234, 240, 250: bonnet as an FRP panel for an automobile having an FRP laminated structure
232: FRP plate
233, 236: resin layer as a high breaking elongation layer
235, 242, 243, 252, 253: FRP layer
241: resin net as a high breaking elongation layer
244: frictionally fixed portion
251: fiber substrate non-impregnated with resin as a high breaking elongation layer
254: adhesive portion
A: running direction of an automobile
B: ±45° disposition
C: 0°/90° disposition

THE BEST MODE FOR CARRYING OUT THE INVENTION

Hereinafter, desirable embodiments of the present invention will be explained referring to figures.

FIG. 1 shows an FRP panel for an automobile according to an embodiment of the present invention, and in particular, shows an aspect when an impact load (for example, an impact load at the time of collision with a pedestrian) is applied from outside in a case where the present invention is applied to a bonnet of an automobile. In FIG. 1, symbol 1 indicates a bonnet as an FRP panel for an automobile, and in the shown example, the FRP panel for an automobile 1 is formed as a sandwich structure where a core material 4 made from an elastic material or a foam material is interposed between a surface-side FRP layer 2 (a first FRP layer) and a back surface-side FRP layer 3 (a second FRP layer) disposed with a gap. A difference in rigidity (difference in planar rigidity) is provided between these surface-side and back surface-side FRP layers 2, 3, and in this embodiment, the rigidity of the surface-side FRP layer 2 is set lower. Symbol 5 indicates a base structural body such as an inside body, and symbol 6 indicates an inside mounted object including an engine and the like.

Figure 2:
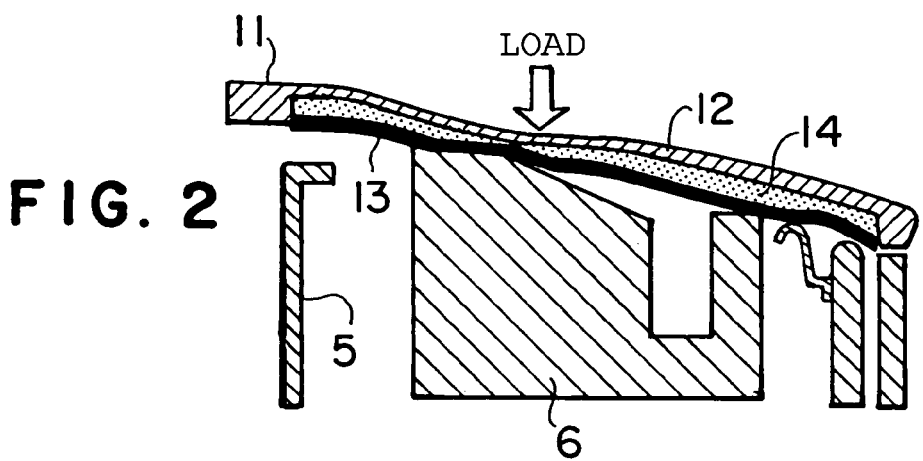
FIG. 2 is a vertical sectional view of an FRP panel for an automobile according to another embodiment of the present invention.

FIG. 2 shows an FRP panel for an automobile according to another embodiment of the present invention, and an FRP panel for an automobile 11 used as a bonnet is formed as a sandwich structure where a core material 14 made from an elastic material or a foam material is interposed between a surface-side FRP layer 12 (a first FRP layer) and a back surface-side FRP layer 13 (a second FRP layer) disposed with a gap, and as compared with the embodiment shown in FIG. 1, the rigidity of the back surface-side FRP layer 13 is set lower. This embodiment is suitable particularly for a case where the distance between the bonnet as the FRP panel for an automobile 11 and the inside mounted object 6 is small, as compared with the embodiment shown in FIG. 1. In the FRP panel for an automobile shown in FIG. 1 or 2, as aforementioned, it is possible to form the portion between the surface-side and back surface-side FRP layers as a hollow structure without interposing a core material.

Thus, by forming the low-rigidity FRP layer (2 or 13) as a crushable layer, an impact energy can be properly absorbed at the time of collision with a pedestrian, etc. In a case where the crushable layer is present on an outer skin side, the energy is absorbed at a side coming into contact directly with a pedestrian, etc., and on the contrary, in a case where the crushable layer is present on a back surface side, the energy is absorbed by being crushed when coming into contact with inside mounted object 6. Further, the stroke at the time of collision which an outer panel can obtain is set by a distance between inside mounted object 6 made from an iron, an aluminum, etc. and the outer panel, it is preferred to use a soft core material for an area having a long stroke and a relatively hard core material for an area having a short stroke, and whereby the impact absorption property can be optimized locally. Where, although the degree of the difference in rigidity between the surface-side and back surface-side FRP layers is not particularly restricted, it is preferred to appropriately set the lower rigidity in a range of about 10% to about 80% of the higher rigidity.

The FRP layer of the FRP panel for an automobile according to the present invention means a resin layer reinforced by reinforcing fibers, and as the reinforcing fibers, for example, inorganic fibers such as carbon fibers or glass fibers and organic fibers such as Kevler fibers, polyethylene fibers or polyamide fibers can be raised. From the viewpoint of easiness of control of planar rigidity, particularly carbon fibers are preferable. As the matrix resin of FRP layer, for example, a thermosetting resin such as an epoxy resin, an unsaturated polyester resin, a vinylester resin or a phenolic resin can be raised, and further, a thermoplastic resin such as a polyamide resin, a polyolefin resin, a dicyclopentadiene resin or a polyurethane resin also can be used. Further, as the core material, an elastic material, a foam material or a honeycomb material can be used, and for lightening in weight, particularly a foam material is preferred. The raw material for the foam material is not particularly limited, and for example, a foam material of a polymer such as polyurethane, acrylic, polystyrene, polyimide, vinyl chloride or phenol and the like can be employed. The honeycomb material is not particularly limited, and for example, an aluminum alloy, a paper, an aramide paper and the like can be used.

Figure 3:
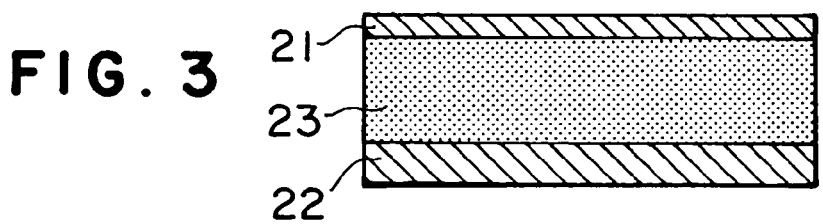
FIG. 3 is a partial sectional view, showing an example of a sandwich structure of an FRP panel for an automobile in the present invention.
Figure 4:
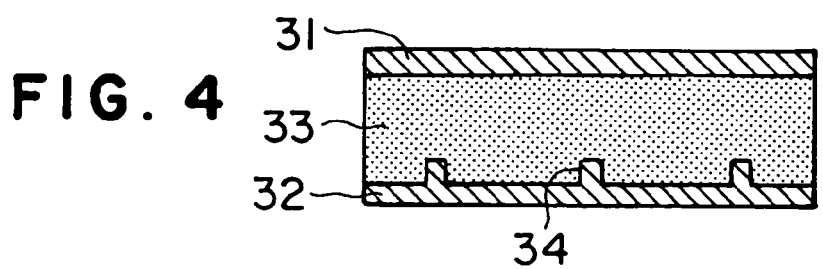
FIG. 4 is a partial sectional view, showing another example of a sandwich structure of an FRP panel for an automobile in the present invention.
Figure 5:
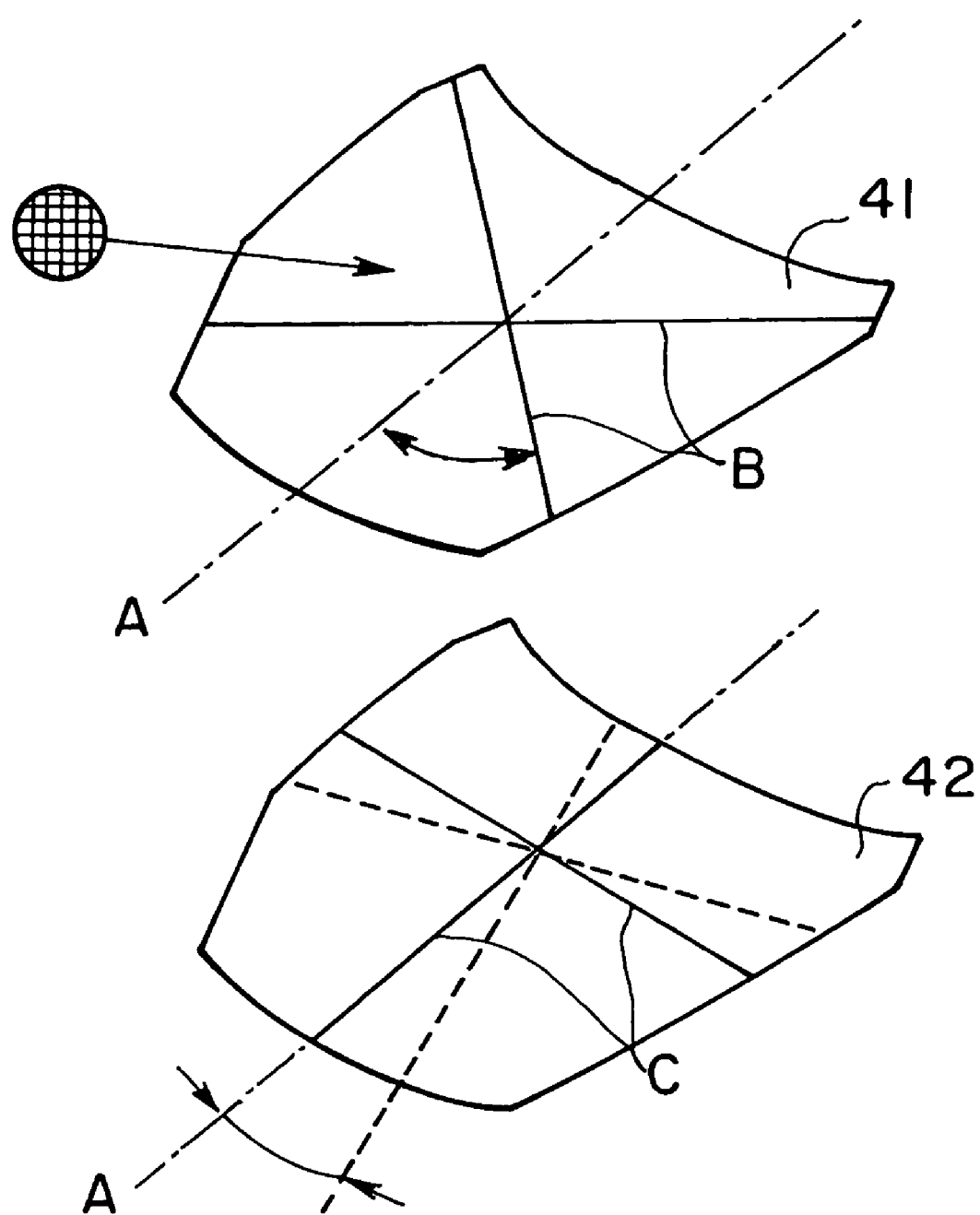
FIG. 5 is an exploded perspective view of first and second FRP layers, showing an example of a structure for providing a difference in rigidity between the first and second FRP layers in the present invention.

In a case where the FRP panel for an automobile according to the present invention has a sandwich structure, the above-described provision of the difference in rigidity can be achieved by structures shown in FIGS. 3 to 5. In the structure shown in FIG. 3, an FRP layer 21 the rigidity of which is wanted to be set to be low is set to be thin, an layer 22 the rigidity of which is wanted to be set to be high is set to be thick, and a core material 23 is interposed therebetween. In the structure shown in FIG. 4, a rib-like stiffener 34 projecting toward the interior of a core material 33 is formed on an FRP layer 32 the rigidity of which is set to be high, relative to an FRP layer 31 the rigidity of which is set to be low. This FRP layer 32 may be thickened at the same time. Further, the stiffener 34 may be projected to outside if there is no inconvenience. In the structure shown in FIG. 5, for example, a crushable structure is achieved by setting, with respect to a running direction A of an automobile, the main orientation direction of reinforcing fibers of a surface-side FRP layer 41, the rigidity of which is set to be low, in a range of ±20° relative to ±45° disposition B, and a structure hard to be deflected is achieved by setting the main orientation direction of reinforcing fibers of a back surface-side FRP layer 42, the rigidity of which is set to be high, in a range of ±20° relative to 0°/90° disposition C. Except these structures, as aforementioned, the difference in rigidity between the surface-side and back surface-side FRP layers can also be given by providing a difference in strength or elastic modulus of reinforcing fiber or by providing a difference in content of reinforcing fibers. Further, it becomes possible to provide a desirable difference in rigidity more efficiently by appropriately combining these structures for providing a difference in rigidity.

Further, in the present invention, in a case where the FRP panel for an automobile has a sandwich structure, as aforementioned, it is possible to substantially give the difference in planar rigidity between the surface-side and back surface-side FRP layers substantially even by providing a difference in hardness to the core material in its thickness direction.

Figure 6:
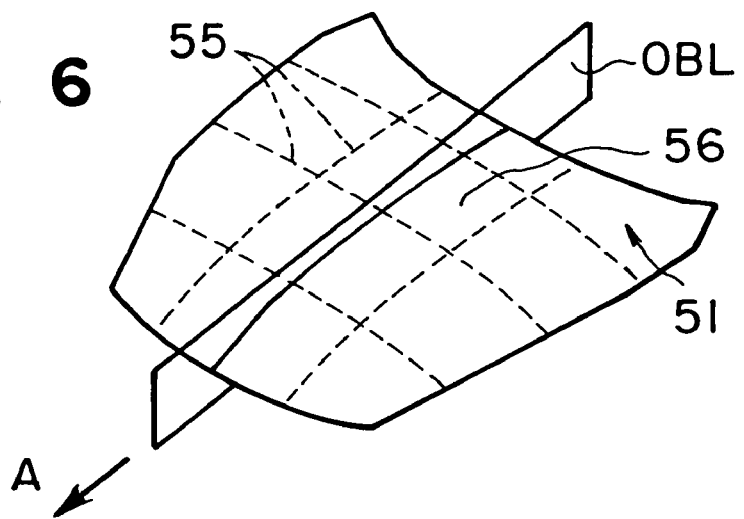
FIG. 6 is a schematic perspective view of an FRP panel for an automobile according to a further embodiment of the present invention.
Figure 7:
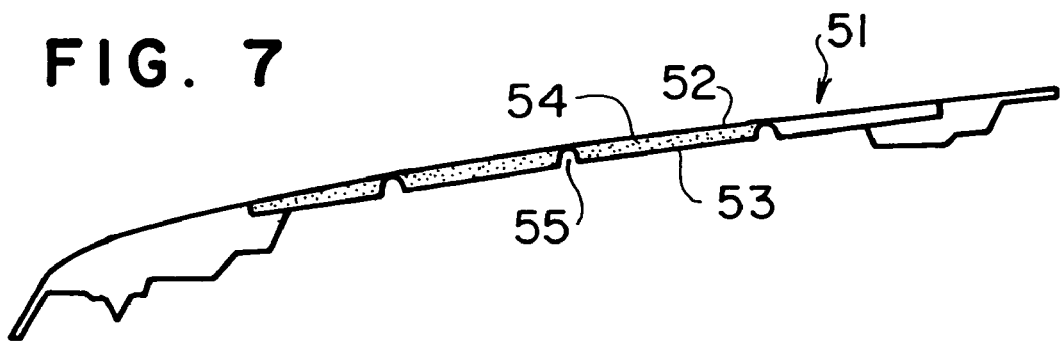
FIG. 7 is a vertical sectional view of the FRP panel for an automobile depicted in FIG. 6.

FIGS. 6 and 7 show an FRP panel for an automobile according to another embodiment of the present invention, in particular, a case where the present invention is applied to a bonnet of an automobile. In FIGS. 6 and 7, symbol 51 indicates a bonnet as an FRP panel for an automobile, in the example shown in the figures, FRP panel for an automobile 51 is formed as a sandwich structure wherein a core material 54 made from an elastic material, a foam material, etc. is interposed between a surface-side FRP layer 52 and a back surface-side FRP layer 53, and in this embodiment, groove-like concave portions 55 extending almost straightly are provided on the outer surface of this panel 51, in particular, on the back surface side. In this embodiment, concave portions 55 extend in nearly 0°/90° direction relative to running direction A of the automobile, and the FRP panel for an automobile 51 is sectioned in a lattice-like form into nearly rectangular areas 56 by the plurality of concave portions 55 extending in both directions. The extending direction of the concave portion 55 is preferably in a range of ±20° from the viewpoint of efficient impact energy absorption. By providing the above-described groove-like concave portions 55, the section in a center plane 0BL extending in the running direction of the automobile becomes as shown in FIG. 7.

As described above, by providing the groove-like concave portions 55 extending almost straightly on the outer surface of the FRP panel for an automobile 51, the strength and rigidity of the part can be locally lowered and a trigger point of breakage or deformation against impact can be intentionally formed, thereby realizing a crushable structure capable of effectively absorbing impact energy. In particular, because such a crushable structure can be formed on a proper portion with respect to the running direction of an automobile, it becomes possible to satisfy the aforementioned requirement for protecting a pedestrian at the time of collision accident and the like.

Figure 8:
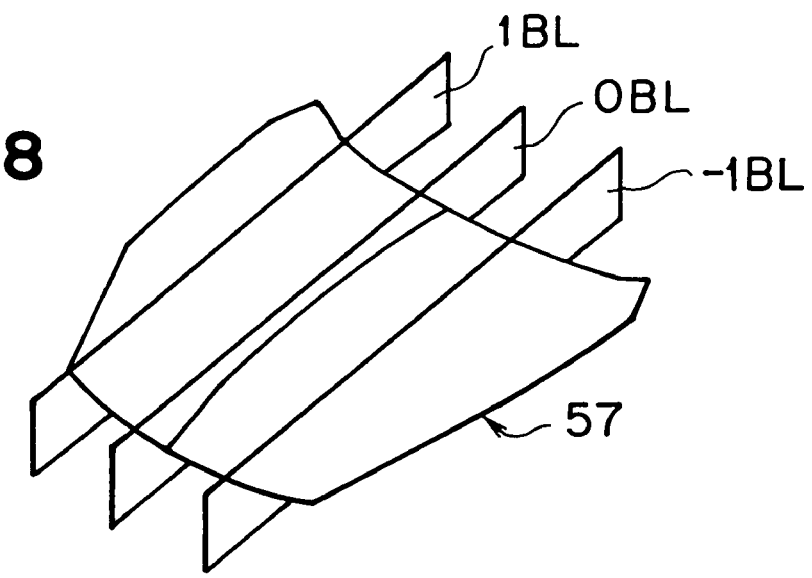
FIG. 8 is a schematic perspective view of an FRP panel for an automobile according to a still further embodiment of the present invention.
Figure 9:
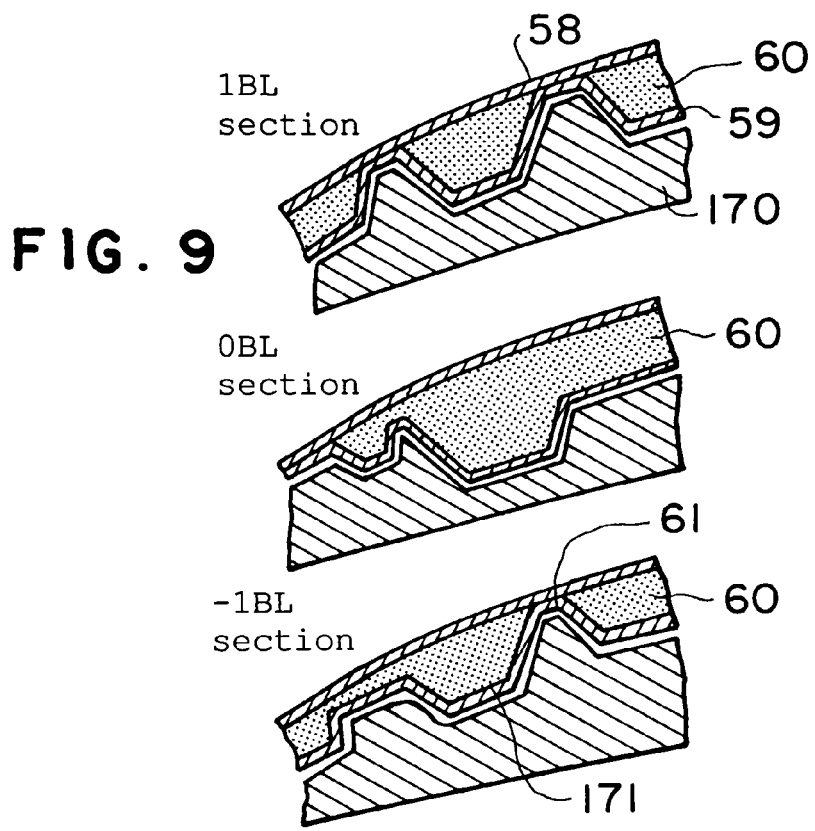
FIG. 9 is a partial vertical sectional view of each section of the FRP panel for an automobile depicted in FIG. 8.

The cross-sectional shape of the above-described groove-like concave portion can be appropriately changed depending upon the part of FRP panel for an automobile 51. Namely, the strength and rigidity can be appropriately adjusted depending upon the part. Further, the thickness of the panel also can be optimized depending upon the distance up to an inside mounted object. For example, in a bonnet 57 shown in FIG. 8 as an outer panel for an automobile, the shapes at 0BL, 1BL and −1BL (these are sections different in position in the width direction, 0BL is a section of a center plane in the width direction, and 1BL and −1BL are sections at left and right positions thereof.) can be set to be shapes different from each other, for example, as shown in FIG. 9. In this example, bonnet 57 is formed as a sandwich structure wherein a core material 60 is interposed between surface-side and back surface-side FRP layers 58 and 59, concave portion 51 and convex portion 171 are provided on its back surface side, and the shape of the concave/convex is formed along the concave/convex shape of an inside mounted object 170. Further, the hardness of the core material 60 can also be changed in accordance with the part. For example, as aforementioned, by adjusting the hardness of the core material 60, it is possible to dispose a hard core material at a place the distance (stroke) of which up to the inside mounted object is short, and to dispose a soft core material at a place the distance of which up to the inside mounted object is long, respectively.

Figure 10:
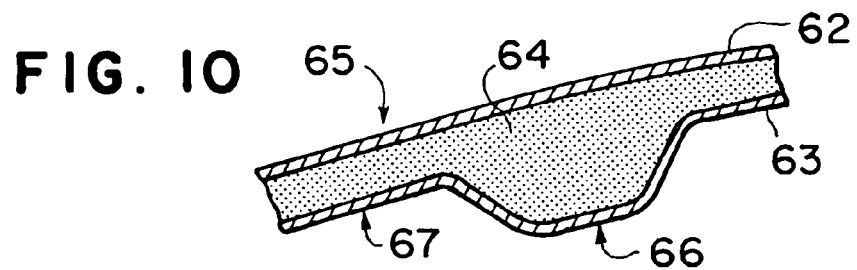
FIG. 10 is a partial vertical sectional view of an FRP panel for an automobile according to a still further embodiment of the present invention.

Further, in the FRP panel for an automobile according to the present invention, a structure can be employed wherein, without providing the above-described groove-like concave portion, or by providing a hill-like convex portion together with the concave portion, the strength and rigidity of the part provided with the convex portion are increased locally, and the strength and rigidity of the part, which is not provided with the convex portion, are relatively decreased locally. For example, as an FRP panel for an automobile 65 with a sandwich structure interposing a core material 64 between surface-side and back surface-side FRP layers 62 and 63 is shown in FIG. 10, the structure can be formed so that a convex portion 66 is provided, for example, on the back surface side, the strength and rigidity of this portion are increased locally, and the strength and rigidity of a standard portion 67 without the convex portion is relatively decreased locally.

Figure 11:
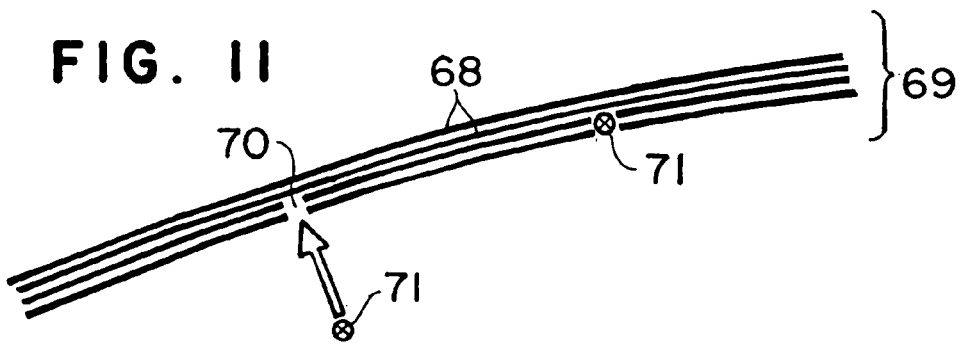
FIG. 11 is a partial vertical sectional view of an FRP panel for an automobile according to a still further embodiment of the present invention.

Further, in the FRP panel for an automobile according to the present invention, a structure of a single FRP plate can be employed, unlimited with the above-described sandwich structure. For example, as shown in FIG. 11, a structure can be employed wherein an FRP plate 69 having a laminated structure of reinforcing fiber substrates 68 is formed, and groove-like concave portions 70 are provided, for example, on the back-surface side of this FRP plate 69.

Furthermore, in the FRP panel for an automobile according to the present invention, although the above-described concave portions may be left as they are, in a case where it is not preferable from the viewpoint of appearance, a charged material (filler) can be provided thereinto. For example, as shown in FIG. 11, it is possible to charge filler 71 into the concave portions 70, thereby making the appearance look as if the concave portions 70 were not present. Such a filler contributes to increase the compression rigidity at the concave portions 70 and maintain a desired shape of the panel, and although a tensile load is applied to the concave portions 70 charged with the filler when an impact load is applied from the surface side, the tensile strength and rigidity at that time can be maintained at the same level as those of a case where the filler is not charged, and a desirable impact energy absorption property is not damaged.

Figure 12:
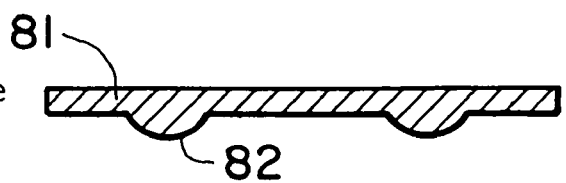
FIG. 12 is a partial vertical sectional view of an FRP panel for an automobile, showing an example of a form of each of various structures.
Figure 12:
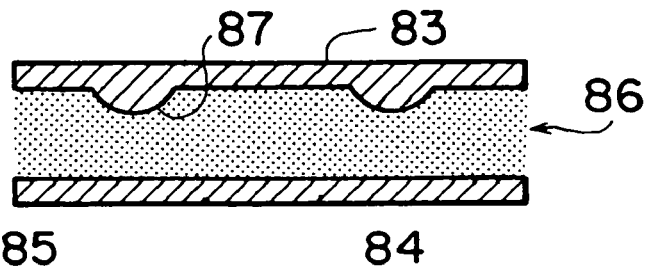
Figure 12:
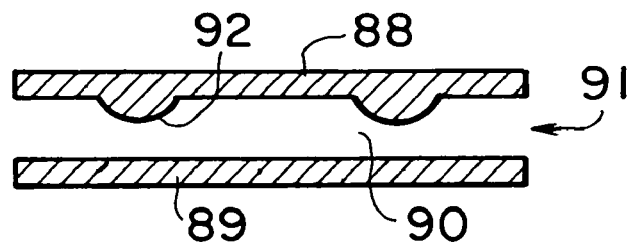

In the FRP panel for an automobile according to the present invention, the above-described groove-like concave portion or hill-like convex portion can be provided at various forms as shown in FIGS. 12 to 18. FIG. 12 shows a concave/convex formation wherein a groove-like concave portion is not provided and hill-like convex portions projecting toward the interior are provided, (A) shows a formation wherein convex portions 82 are provided on the back-surface side (inner-surface side) of an FRP single plate 81, (B) shows a formation wherein convex portions 87 are provided on the back-surface side of a surface-side FRP layer 83 of an FRP panel for an automobile 86 with a sandwich structure interposing a core material 85 between surface-side and back surface-side FRP layers 83 and 84, and (C) shows a formation wherein convex portions 92 are provided on the back-surface side of a surface-side FRP layer 88 of an FRP panel for an automobile 91 with a hollow structure forming a hollow portion 90 between surface-side and back surface-side FRP layers 88 and 89, respectively.

Figure 13:
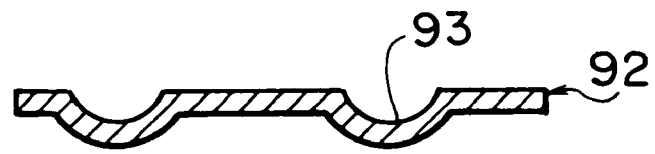
FIG. 13 is a partial vertical sectional view of an FRP panel for an automobile, showing another example of a form of each of various structures.
Figure 13:
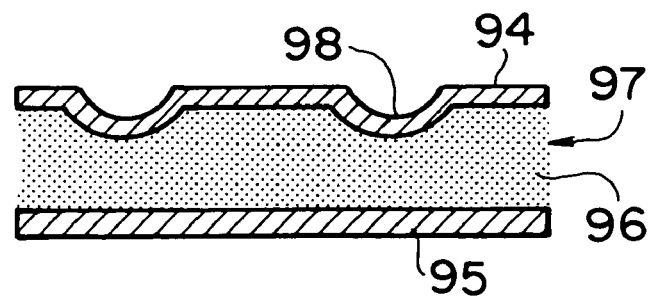
Figure 13:
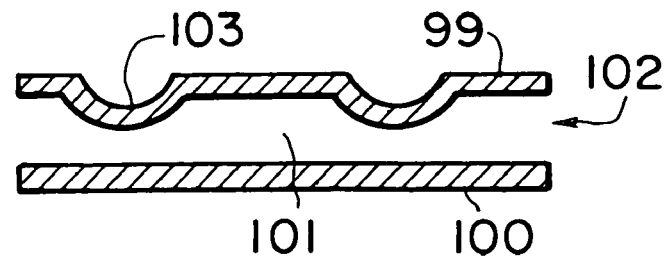

FIG. 13 shows a formation with inward projecting type groove-like concave portions each of which is formed so as to be recessed like a groove against outside and to be projected against inside, (A) shows a formation wherein concave portions 93 are provided on the surface side of an FRP single plate 92, (B) shows a formation wherein concave portions 98 are provided on the surface side of a surface-side FRP layer 94 of an FRP panel for an automobile 97 with a sandwich structure interposing a core material 96 between surface-side and back surface-side FRP layers 94 and 95, and (C) shows a formation wherein concave portions 103 are provided on the surface side of a surface-side FRP layer 99 of an FRP panel for an automobile 102 with a hollow structure forming a hollow portion 101 between surface-side and back surface-side FRP layers 99 and 100, respectively.

Figure 14:
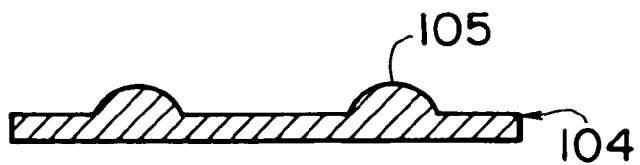
FIG. 14 is a partial vertical sectional view of an FRP panel for an automobile, showing a further example of a form of each of various structures.
Figure 14:
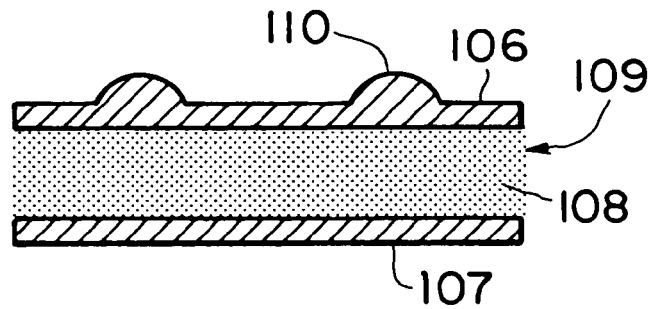
Figure 14:
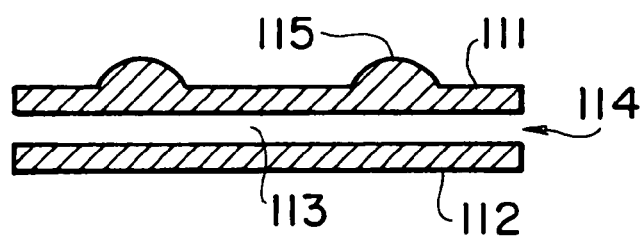

FIG. 14 shows a formation of an outward projecting type having hill-like convex portions each of which is formed so as to be projected against outside by increasing the layer thickness locally. FIG. 14(A) shows a formation wherein convex portions 105 are provided on the surface side of an FRP single plate 104, (B) shows a formation wherein convex portions 110 are provided on the surface side of a surface-side FRP layer 106 of an FRP panel for an automobile 109 with a sandwich structure interposing a core material 108 between surface-side and back surface-side FRP layers 106 and 107, and (C) shows a formation wherein convex portions 115 are provided on the surface side of a surface-side FRP layer 111 of an FRP panel for an automobile 114 with a hollow structure forming a hollow portion 113 between surface-side and back surface-side FRP layers 111 and 112, respectively.

Figure 15:
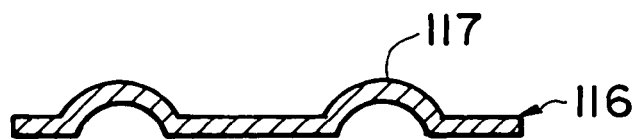
FIG. 15 is a partial vertical sectional view of an FRP panel for an automobile, showing a still further example of a form of each of various structures.
Figure 15:
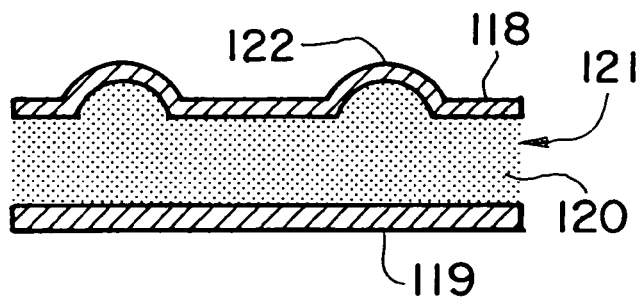
Figure 15:
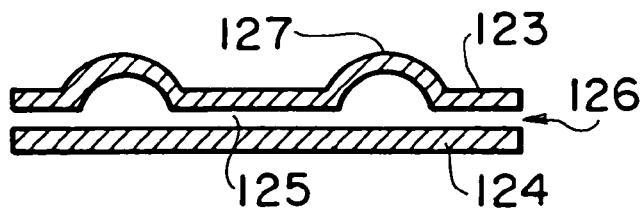

FIG. 15 shows a formation of an outward projecting type having hill-like convex portions each of which is formed so as to be projected against outside by curving the layer without changing the thickness of the layer. The opposite side surface of the convex portion is formed to be groove-like surface. FIG. 15 (A) shows a formation wherein convex portions 117 are provided on the surface side of an FRP single plate 116, (B) shows a formation wherein convex portions 122 are provided on the surface side of a surface-side FRP layer 118 of an FRP panel for an automobile 121 with a sandwich structure interposing a core material 120 between surface-side and back surface-side FRP layers 118 and 119, and (C) shows a formation wherein convex portions 127 are provided on the surface side of a surface-side FRP layer 123 of an FRP panel for an automobile 126 with a hollow structure forming a hollow portion 125 between surface-side and back surface-side FRP layers 123 and 124, respectively.

Figure 16:
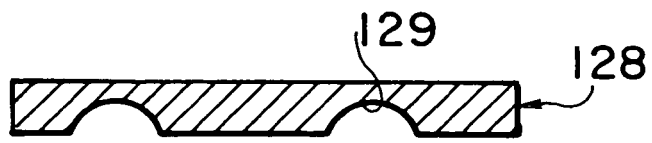
FIG. 16 is a partial vertical sectional view of an FRP panel for an automobile, showing a still further example of a form of each of various structures.
Figure 16:
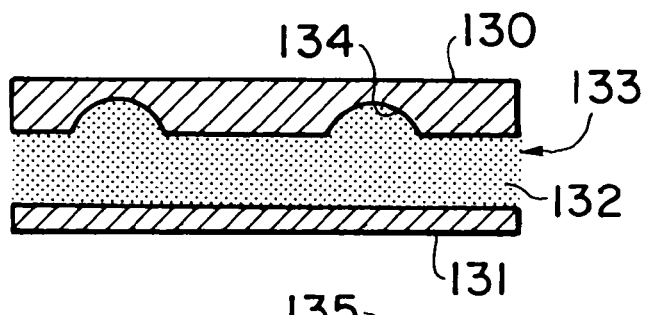
Figure 16:
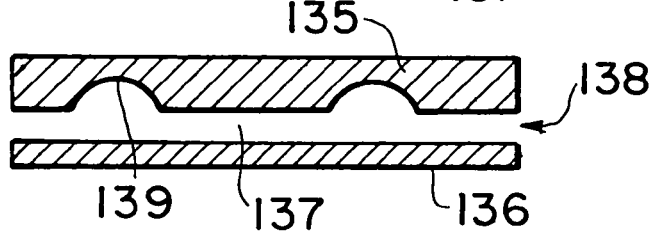

FIG. 16 shows an inward recessed-type formation with groove-like concave portions each of which is formed so as to be recessed locally against inside by increasing the layer thickness locally. FIG. 16(A) shows a formation wherein concave portions 129 are provided on the back-surface side of an FRP single plate 128, (B) shows a formation wherein concave portions 134 are provided on the back-surface side of a surface-side FRP layer 130 of an FRP panel for an automobile 133 with a sandwich structure interposing a core material 132 between surface-side and back surface-side FRP layers 130 and 131, and (C) shows a formation wherein concave portions 139 are provided on the back-surface side of a surface-side FRP layer 135 of an FRP panel for an automobile 138 with a hollow structure forming a hollow portion 137 between surface-side and back surface-side FRP layers 135 and 136, respectively.

Figure 17:
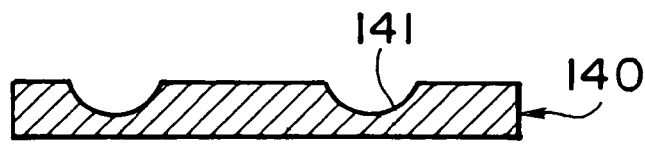
FIG. 17 is a partial vertical sectional view of an FRP panel for an automobile, showing a still further example of a form of each of various structures.
Figure 17:
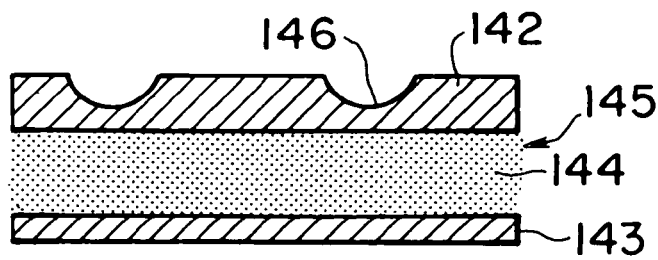
Figure 17:
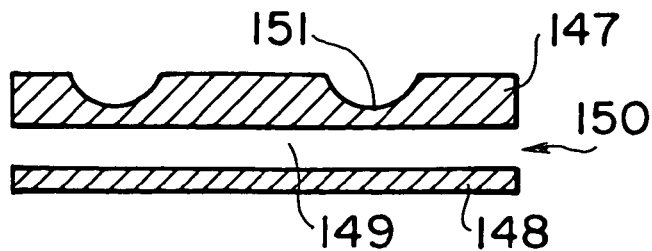

FIG. 17 shows an outward recessed-type formation with groove-like concave portions each of which is formed so as to be recessed locally against outside by increasing the layer thickness locally. FIG. 17(A) shows a formation wherein concave portions 141 are provided on the surface side of an FRP single plate 140, (B) shows a formation wherein concave portions 146 are provided on the surface side of a surface-side FRP layer 142 of an FRP panel for an automobile 145 with a sandwich structure interposing a core material 144 between surface-side and back surface-side FRP layers 142 and 143, and (C) shows a formation wherein concave portions 151 are provided on the surface side of a surface-side FRP layer 147 of an FRP panel for an automobile 150 with a hollow structure forming a hollow portion 149 between surface-side and back surface-side FRP layers 147 and 148, respectively.

Figure 18:
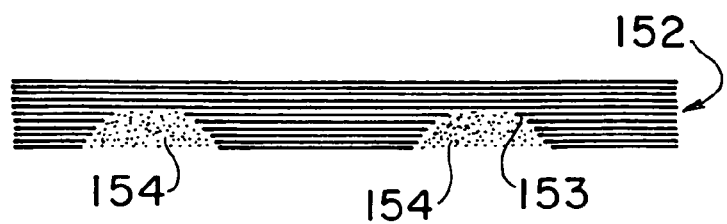
FIG. 18 is a partial vertical sectional view of an FRP panel for an automobile, showing a still further example of a form of the structure.

FIG. 18 shows a structure wherein filler 154 is charged into concave portions 153 in the formation in which the concave portions 153 are provided on the back-surface side of an FRP single plate 152. In each formation shown in FIGS. 12 to 18, a formation replacing the surface side with the back-surface side (the upper side with the lower side) also can be employed.

Figure 19:
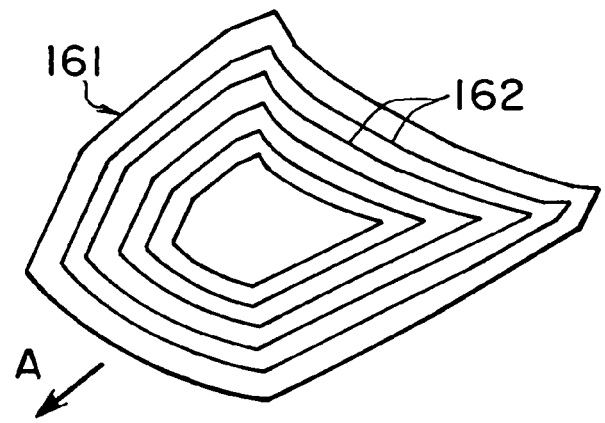
FIG. 19 is a schematic perspective view of an FRP panel for an automobile according to a still further embodiment of the present invention.

Further, in the FRP panel for an automobile according to the present invention, the above-described groove-like concave portion or hill-like convex portion can employ various arbitrary forms except the extension formation shown in FIG. 6. For example, as shown in FIG. 19, in an FRP panel for an automobile 161 forming a bonnet, a structure can be employed wherein a plurality of concave portions or convex portions 162 are provided so as to depict a multiple closed curved line with a nearly concentric analog formation along the outer circumferential shape of the FRP panel for an automobile 161.

Figure 20:
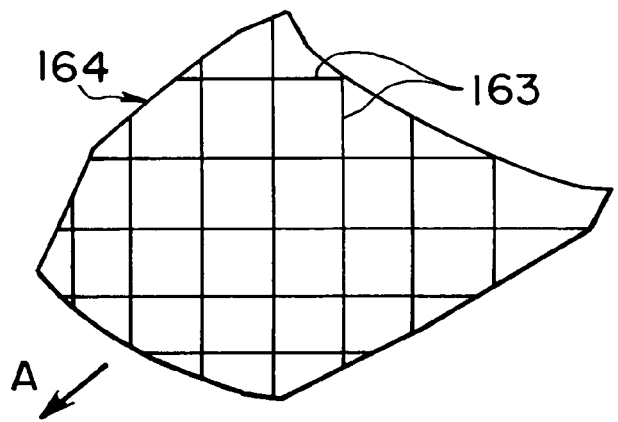
FIG. 20 is a schematic perspective view of an FRP panel for an automobile according to a still further embodiment of the present invention.

Further, as shown in FIG. 20, an FRP panel for an automobile 164 can be formed in which a plurality of concave portions or convex portions 163 extend in directions within ±20° relative to ±45° directions with respect to the running direction A of the automobile, and a structure also can be employed wherein the panel is sectioned in a lattice-like form into nearly diamond-shaped areas by the plurality of concave portions or convex portions 163.

Figure 21:
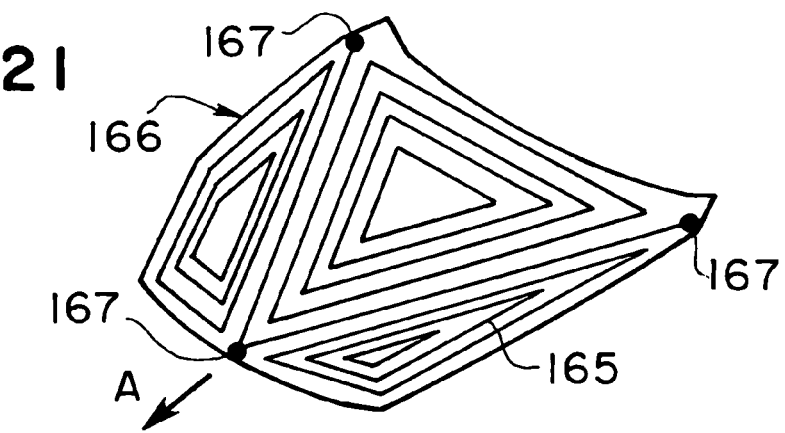
FIG. 21 is a schematic perspective view of an FRP panel for an automobile according to a still further embodiment of the present invention.

Furthermore, as shown in FIG. 21, a structure can be employed wherein a plurality of concave portions or convex portions 165 extend along both of the outer circumferential shape of an FRP panel for an automobile 166 and the line connecting between a plurality of attachment parts of the FRP panel for an automobile 166 (for example, attachment parts for strikers 167 of the bonnet), and a structure also can be employed wherein the plurality of concave portions or convex portions 165 depict a multiple closed curved line with a nearly concentric analog formation.

Figure 22:
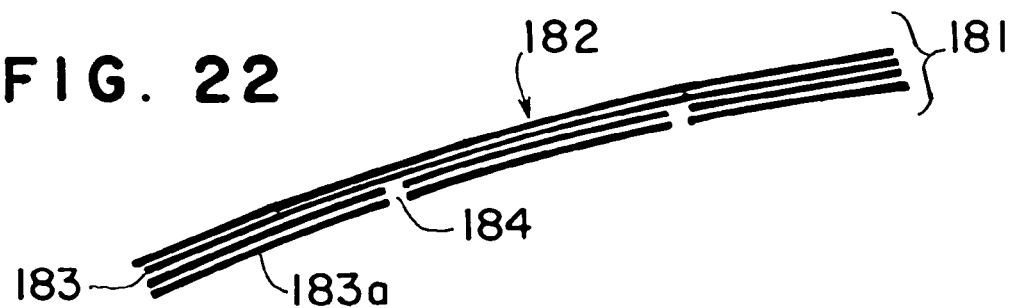
FIG. 22 is a partial sectional view of an FRP panel for an automobile according to a still further embodiment of the present invention.

FIG. 22 shows an FRP panel for an automobile according to a further embodiment of the present invention, and shows a case where the panel is formed as a single FRP plate. In FIG. 22, symbol 181 indicates an FRP plate as an FRP panel for an automobile having an FRP planar structural part 182. In order to form the FRP planar structural part 182, FRP plate 181 has a plurality of reinforcing fiber substrates 183 in its interior, and in this embodiment, among these substrates, several layers of reinforcing fiber substrates 183a, positioned on the back-surface side opposite to the surface side forming a design surface, have discontinuous parts 184 of the reinforcing fiber substrates 183a which have gaps in the layer extending direction. A part present with this discontinuous part 184 becomes a starting point of breakage against an impact load applied from outside. Where, although the discontinuous part 184 is depicted as a space part in FIG. 22, a matrix resin of the FRP plate 181 exists also in this part. By such a structure, when a usual external load operates, even if the reinforcing fiber substrate is discontinuous, a strain is transmitted to the reinforcing fiber substrate via the matrix resin, and a structural body having predetermined rigidity and strength can be achieved. However, when an external load more than a usual load is applied, namely, when the body, particularly, the head, of a pedestrian collides with the FRP panel for an automobile according to the present invention at the time of collision between the automobile and the pedestrian, the above-described discontinuous part becomes a trigger point for breakage, the FRP panel propagates the breakage sequentially, the impact due to the collision can be absorbed. Also in the following figures, similar operations are exhibited.

Figure 23:
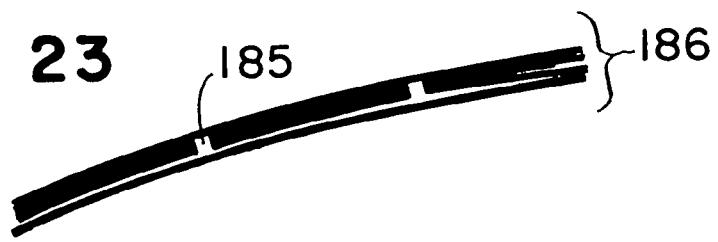
FIG. 23 is a partial sectional view of an FRP panel for an automobile according to a still further embodiment of the present invention.

The above-described discontinuous part can be formed basically as to the reinforcing fiber substrates located at a position except the surface side forming a design surface. For example, as shown in FIG. 23, an FRP plate 186 can be formed wherein discontinuous parts 185 are provided between layers, that is, in the reinforcing fiber substrates of intermediate layers.

Figure 24:
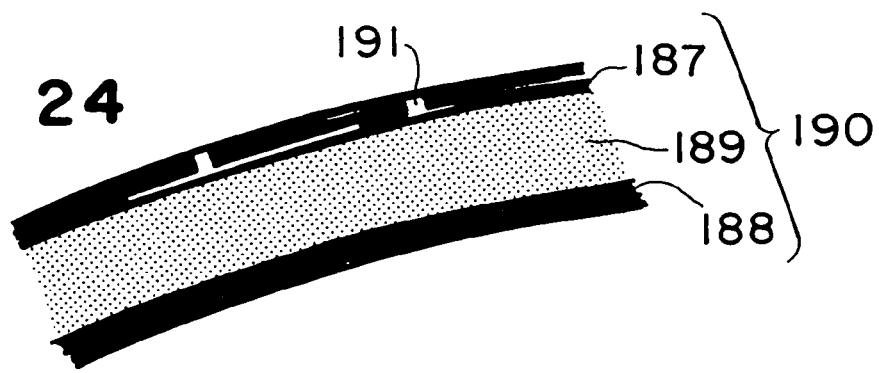
FIG. 24 is a partial sectional view of an FRP panel for an automobile according to a still further embodiment of the present invention.
Figure 25:
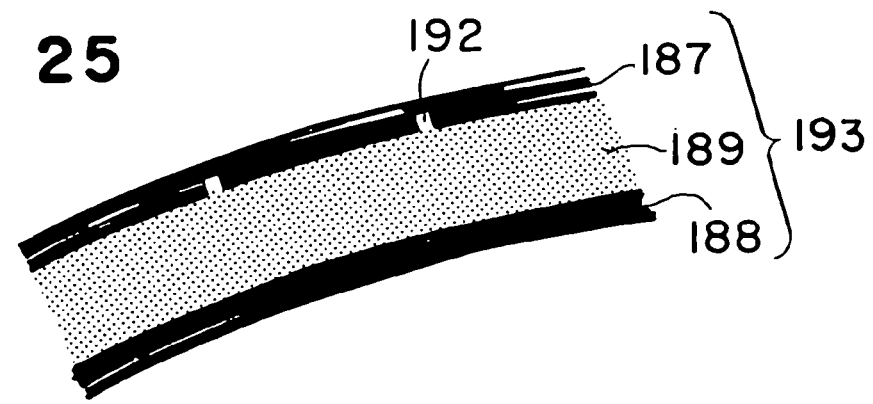
FIG. 25 is a partial sectional view of an FRP panel for an automobile according to a still further embodiment of the present invention.

Further, as shown in FIG. 24, in a case of an FRP structural body 190 with a sandwich structure wherein a core material 189 is interposed between a surface-side FRP layer 187 and a back surface-side FRP layer 188, for example, a structure can be employed wherein discontinuous parts 191 are provided between the layers of the surface-side FRP layer 187, that is, in the intermediate reinforcing fiber substrate, or, as shown in FIG. 25, a structure of an FRP panel for an automobile 193 can be employed wherein discontinuous parts 192 are provided on the back-surface side of the surface-side FRP layer 187, that is, on the reinforcing fiber substrate of the side coming into contact with or facing the core material 189.

Figure 26:
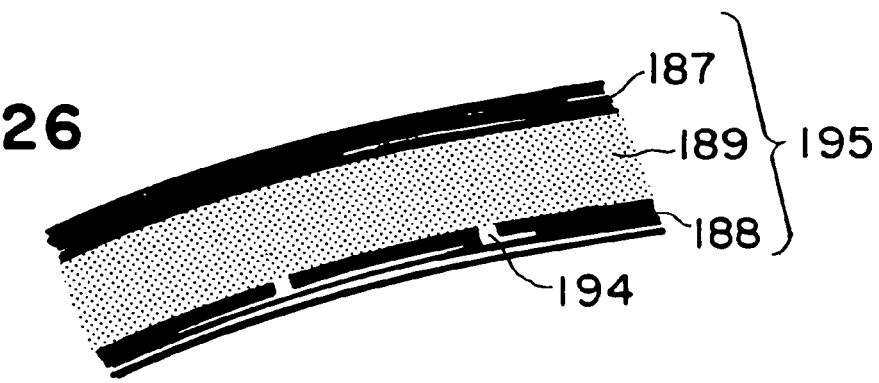
FIG. 26 is a partial sectional view of an FRP panel for an automobile according to a still further embodiment of the present invention.
Figure 27:
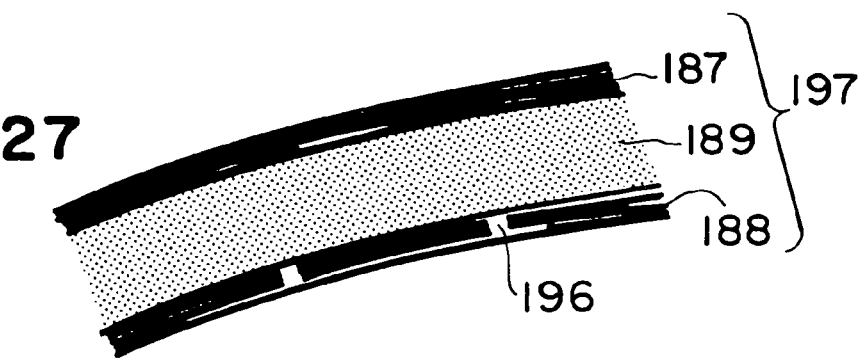
FIG. 27 is a partial sectional view of an FRP panel for an automobile according to a still further embodiment of the present invention.
Figure 28:
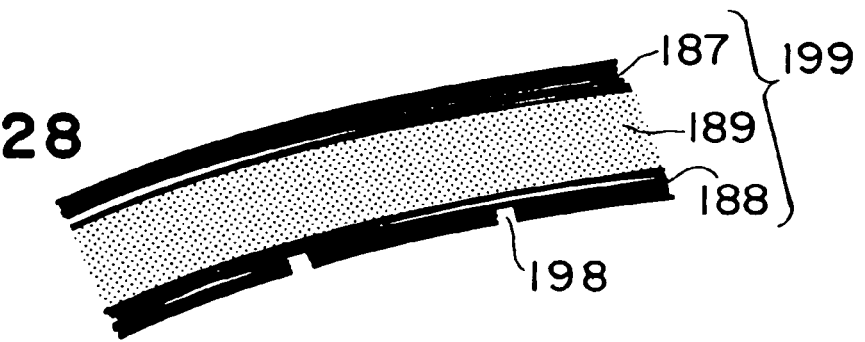
FIG. 28 is a partial sectional view of an FRP panel for an automobile according to a still further embodiment of the present invention.

Further, as shown in FIG. 26, a structure of an FRP panel 195 can be employed wherein discontinuous parts 194 are provided on the surface side of the back surface-side FRP layer 188, that is, on the reinforcing fiber substrate of the side coming into contact with or facing the core material 189, and as shown in FIG. 27, a structure of an FRP panel 197 can also be employed wherein discontinuous parts 196 are provided between the layers of the back surface-side FRP layer 188, that is, in the intermediate reinforcing fiber substrate, and further, as shown in FIG. 28, a structure of an FRP panel for an automobile 199 can also be employed wherein discontinuous parts 198 are provided on the reinforcing fiber substrate positioned at the back-surface side of the back surface-side FRP layer 188 (the lower side of the back surface).

It is preferred that the above-described discontinuous part extends almost straightly in a predetermined direction so that it easily becomes a trigger point for breakage when an impact is applied. Although this extending direction of the discontinuous part may be set in accordance with a part to be applied, for example, in a case applied to an FRP panel for an automobile, particularly to a bonnet of an automobile, it may be set so that an impact energy can be absorbed most effectively with respect to the running direction of the automobile when the impact energy is applied at the time of collision and the like, namely, so that a desirable crushable structure against the impact energy can be realized.

Figure 29:
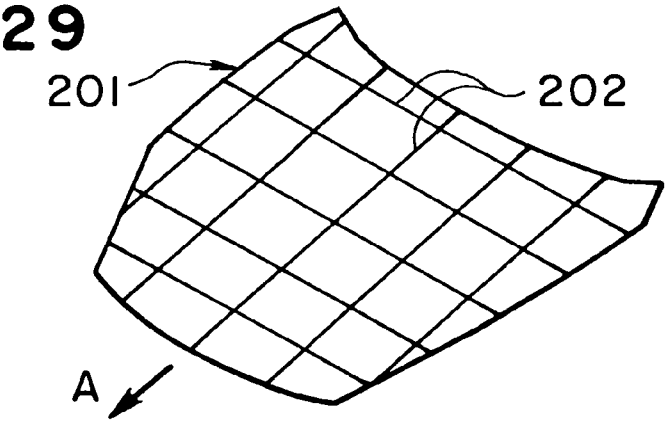
FIG. 29 is a perspective view of an FRP panel for an automobile according to a still further embodiment of the present invention.
Figure 30:
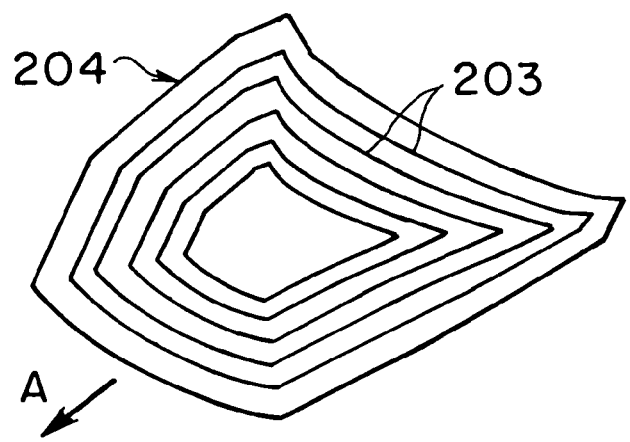
FIG. 30 is a perspective view of an FRP panel for an automobile according to a still further embodiment of the present invention.
Figure 31:
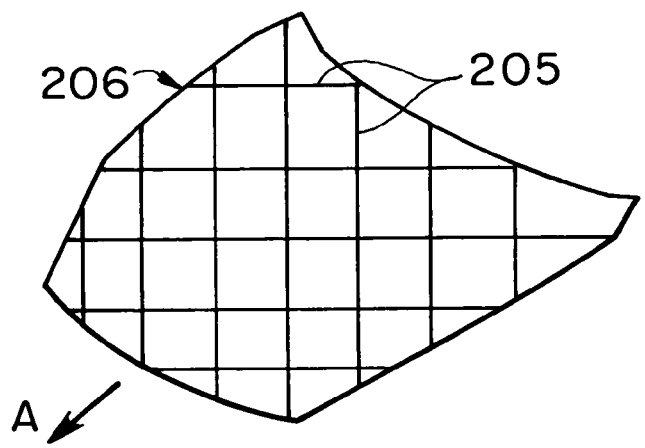
FIG. 31 is a perspective view of an FRP panel for an automobile according to a still further embodiment of the present invention.
Figure 32:
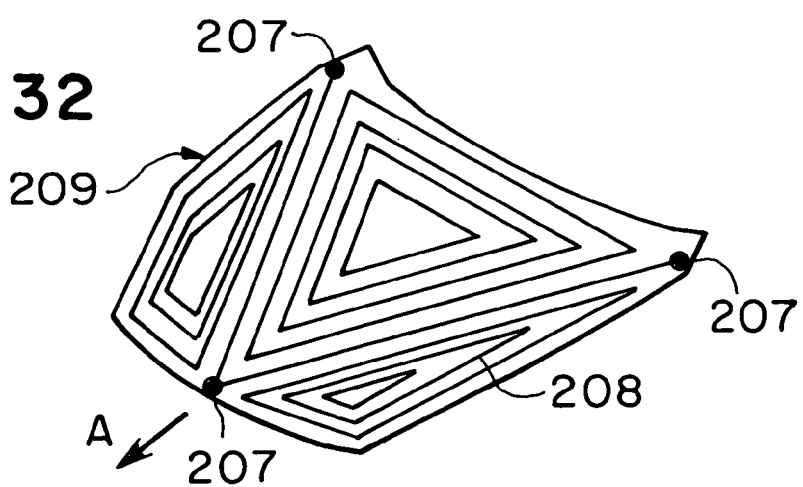
FIG. 32 is a perspective view of an FRP panel for an automobile according to a still further embodiment of the present invention.

For example, as shown in FIG. 29, in an FRP panel 201 forming a bonnet, a structure can be employed wherein, with respect to the running direction of automobile A, discontinuous parts 202 extend in directions within a range of ±20° relative to 0°/90° directions. Further, as shown in FIG. 30, a structure of an FRP structural body 204 can also be employed wherein discontinuous parts 203 extend in nearly 0°/90° directions so as to depict a multiple closed curved line. Further, as shown in FIG. 31, a structure of an FRP panel 206 can also be employed wherein, with respect to the running direction A of an automobile, discontinuous parts 205 extend in directions within a range of ±20° relative to ±45° directions. Furthermore, as shown in FIG. 32, because usually three hinge-structure supporting or engaging portions 207 are provided, a structure of an FRP panel 209 for an automobile can also be employed wherein discontinuous parts 208 are provided along the lines connecting these portions 207 to each other in a multiple triangular shape.

Figure 33:
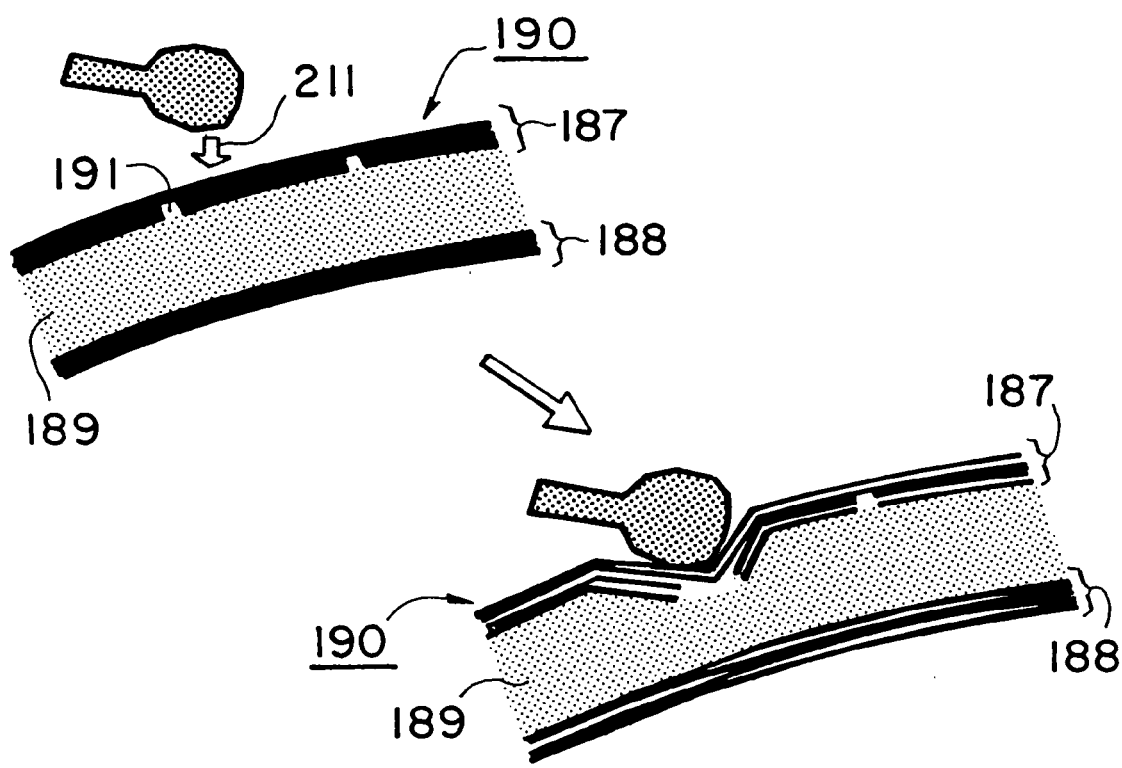
FIG. 33 is a partial sectional view of an FRP panel for an automobile according to an embodiment of the present invention, showing an aspect of impact absorption.

In the above-described FRP panel for an automobile according to the present invention, the aspect of breakage, when an impact load is applied, becomes, for example, as shown in FIG. 33. FIG. 33 is shown with respect to the FRP structural body 190 with a sandwich structure depicted in the aforementioned FIG. 24, when an impact load 211 is applied, a rapid tensile load acts on a corresponding discontinuous portion 191 provided on the back-surface side of the surface-side FRP layer 187, the discontinuous portion 191 existing on this portion becomes a trigger point for breakage, the breakage propagates as shown in the figure, and the impact energy is absorbed. At that time, because the core material 189 of the sandwich structure made from a foam material and the like also absorbs the impact energy by its own deformation, the impact energy is absorbed more properly.

Figure 34:
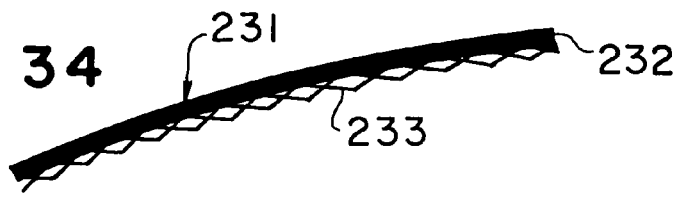
FIG. 34 is a partial sectional view of a bonnet as an FRP panel for an automobile according to a still further embodiment of the present invention.

FIG. 34 shows an FRP panel for an automobile having an FRP lamination according to a further embodiment of the present invention, and shows a case where the present invention is applied to a bonnet of an automobile as an FRP panel for an automobile. In FIG. 34, symbol 231 indicates a partial section of a bonnet of an automobile as an FRP laminated structural body with an FRP planar structural part. In this embodiment, bonnet 231 is formed as an FRP laminated structural body, which comprises an FRP plate 232 as an FRP layer comprising a reinforcing fiber substrate and a matrix resin, and a high breaking elongation layer 233 disposed inside the FRP plate 232 and having a high elongation property that reaches breakage at an elongation higher than that of the FRP layer. In this embodiment, the high breaking elongation layer 233 comprises a flexible resin different from the matrix resin of FRP plate 232. Such a high breaking elongation layer 233 can be molded integrally with FRP plate 232, and can also be molded separately therefrom and bonded to the back-surface side of the FRP plate 232.

The above-described FRP plate or FRP layer also means a resin layer reinforced by reinforcing fibers, and as the reinforcing fibers, for example, inorganic fibers such as carbon fibers or glass fibers and organic fibers such as Kevler fibers, polyethylene fibers or polyamide fibers can be raised. From the viewpoint of easiness of control of planar rigidity, particularly carbon fibers are preferable. As the matrix resin of FRP, for example, a thermosetting resin such as an epoxy resin, an unsaturated polyester resin, a vinylester resin or a phenolic resin can be raised, and further, a thermoplastic resin such as a polyamide resin, a polyolefin resin, a dicyclopentadiene resin or a polyurethane resin also can be used. Where, because the high breaking elongation layer is disposed, between the FRP layer and the high breaking elongation layer, the elongation of the high breaking elongation layer is always set higher.

Figure 35:
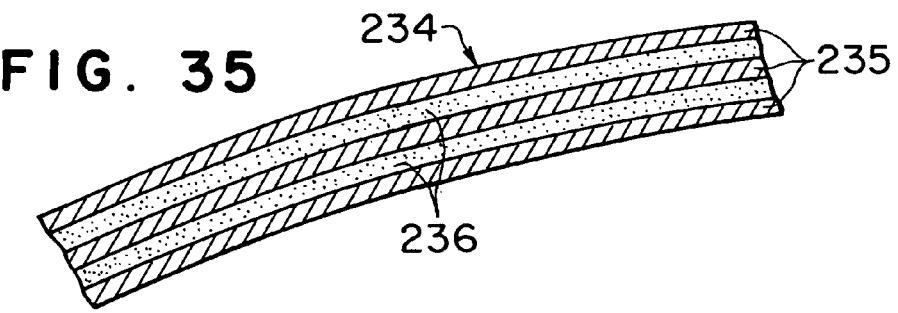
FIG. 35 is a partial sectional view of a bonnet as an FRP panel for an automobile according to a still further embodiment of the present invention.

Further, for example, as shown in FIG. 35, the above-described FRP panel for an automobile according to the present invention can also be structured wherein high breaking elongation layers 236 are disposed in an alternate lamination formation relative to a plurality of FRP layers 235 forming a bonnet 234 as an FRP panel for an automobile. Also in this case, it is preferred that the respective high breaking elongation layers 236 are disposed inside the respective FRP layers 235, or that each high breaking elongation layer 236 is nipped between the FRP layers 235. Further, it can also be structured that the high breaking elongation layer 236 is disposed eccentrically at an inside position relative to the center in the thickness direction of FRP panel for an automobile 234.

In a case of the disposition of alternate lamination as shown in FIG. 35, or in a case of the structure nipping high breaking elongation layer 236 between FRP layers 235, it is possible to form the high breaking elongation layer 236 from a flexible resin similarly in the case of FIG. 34, and further, a structure formed from a thermoplastic resin having a low affinity in adhesion with the matrix resin of FRP layer 235, or a structure formed from a layer containing particles of a thermoplastic resin having a low affinity in adhesion with the matrix resin of FRP layer 235, can also be employed. Further, it is also possible to form the high breaking elongation layer 236 from an FRP layer with a high elongation property, which is different from the FRP layer 235. For example, the high breaking elongation layer 236 can be formed from an FRP layer comprising a flexible resin and a reinforcing fiber substrate, an FRP layer comprising a thermoplastic resin having a low affinity in adhesion with the matrix resin of FRP layer 235 and a reinforcing fiber substrate, an FRP layer comprising a resin containing particles of a thermoplastic resin having a low affinity in adhesion with the matrix resin of FRP layer 235 and a reinforcing fiber substrate, an FRP layer comprising a reinforcing fiber substrate using aramide fibers with a high elongation property, an FRP layer comprising a reinforcing fiber substrate using thermoplastic resin fibers with a high elongation property, etc.

In the bonnet 231 or 234 as an FRP panel for an automobile shown in FIG. 34 or 35, when an impact energy due to a collision and the like is inputted from outside, the high breaking elongation layer 233 or 236 properly absorbs the impact energy by its high elongation property. In particular, because the high breaking elongation layer 233 or 236 holds the load even after the FRP layer 232 or 235 with a lower elongation is broken, the impact energy can be absorbed more properly, and it can be avoided that the entire structural body falls in a state of a great breakage, and therefore, it becomes possible to suppress the breakage of an inside mounted object minimum and to avoid a condition where a pedestrian collides with a hard inside mounted object.

Figure 36:
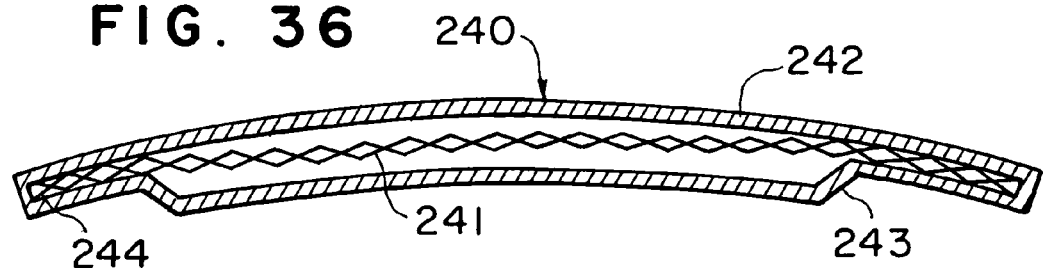
FIG. 36 is a partial sectional view of a bonnet as an FRP panel for an automobile according to a still further embodiment of the present invention.
Figure 37:
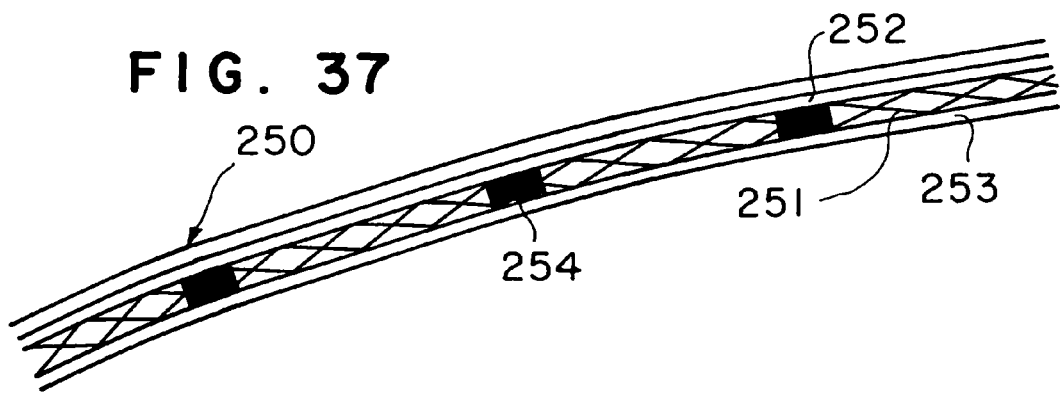
FIG. 37 is a partial sectional view of a bonnet as an FRP panel for an automobile according to a still further embodiment of the present invention.

FIGS. 36 and 37 show partial sections of bonnets of automobiles having FRP lamination structures according to further embodiments of the present invention. In a bonnet 240 shown in FIG. 36, a mesh-like resin net 241 as a separately formed high breaking elongation layer is inserted between FRP layers 242 and 243. The resin net 241 is stretched in a space formed between the FRP layers 242 and 243, and both end portions thereof are fixed and held between the FRP layers 242 and 243. This fixing and holding portion is formed as a frictional fixing portion 244 between the resin net 241 and the FRP layers 242 and 243. In this embodiment, the resin forming the resin net 241 comprises a flexible resin, particularly, a thermoplastic resin having a low affinity in adhesion with the matrix resin of the FRP layers 242 and 243, or a layer containing particles of a thermoplastic resin having a low affinity in adhesion with the matrix resin of the FRP layers 242 and 243.

In the bonnet 240 thus constructed, when an impact energy is applied to the FRP layers 242 and 243, particularly, to the FRP layer 242 from outside, a tensile load is applied to the resin net 241 accompanying with deformation of the FRP layer 242. At that time, the impact energy is properly absorbed by the high elongation property of the resin net 241, and a part of the impact energy is converted into a thermal energy by slipping between the resin net 241 and the FRP layers 242 and 243 caused at the frictional fixing portion 244, thereby absorbing the impact energy more properly.

In a bonnet 250 shown in FIG. 37, a fiber substrate 251 non-impregnated with resin as a separately formed high breaking elongation layer is interposed between FRP layers 252 and 253 at an inside portion in the thickness direction of the bonnet 250. The fiber substrate 251 can be structured as a form of a woven fabric or a net. As its raw material, although it depends upon the relationship with the FRP layers 252 and 253, for example, an aramide fiber having a high elongation property is preferable. In this embodiment, the fiber substrate 251 is fixed by adhesion to the FRP layers 252 and 253 at adhesion portions 254 disposed intermittently. Except at the adhesion portions 254, the fiber substrate 251 is in a state nipped between the FRP layers 252 and 253 and it can appropriately slip relatively to the FRP layers 252 and 253.

In the bonnet 250 thus constructed, when an impact energy is applied to the FRP layers 252 and 253, particularly, to the FRP layer 252 from outside, a tensile load is applied to the fiber substrate 251 accompanying with deformation of the FRP layer 252. At that time, the impact energy is properly absorbed by the high elongation property of the fiber substrate 251, and a part of the impact energy is converted into a thermal energy by slipping caused between the fiber substrate 251 and the FRP layers 252 and 253, thereby absorbing the impact energy more properly.

Further, in the embodiments shown in FIGS. 36 and 37, because, even after breakage of the FRP layers, the high-elongation layer of the resin net 241 or the fiber substrate 251, which has not yet reached breakage, holds a load, the impact energy absorption property is further increased, and it becomes possible to suppress the damage to an inside mounted object to be small and to avoid a condition where a pedestrian collides with a hard inside mounted object.

INDUSTRIAL APPLICATIONS OF THE INVENTION

The FRP panel for an automobile according to the present invention is suitable as an outer panel, in particular, as a bonnet, and by the application of the present invention, an optimum impact absorption property of the bonnet can be realized while the bonnet can be made light in weight.

The invention claimed is:

1. An FRP panel for an automobile comprising at least two FRP layers separated from each other with a first of the FRP layers on a first surface side and a second of the FRP layers on a second surface side on an opposite side of the first surface, wherein i) the first of the FRP layers and the second of the FRP layers are formed either (1) as an FRP solid plate formed integrally with the first of the FRP layers and the second of the FRP layers or (2) as a structure which has a space between the first of the FRP layers and the second of the FRP layers and in which the space is left intact or a core material is disposed in the space, ii) either of the first and second FRP layers is formed as a lower-strength FRP layer, and the lower-strength FRP layer forms a crushable structure that absorbs impacts to a pedestrian during a collision, wherein differences in strength are provided by one or two or more differences selected from the group consisting of a difference in amount of reinforcing fibers, a difference in property of reinforcing fibers and a difference in orientation of reinforcing fibers, and iii) each of the FRP layers is formed integrally as an FRP solid plate and said difference in strength is provided by providing a high breaking elongation layer on the lower strength FRP layer.

2. The FRP panel according to claim 1, wherein said difference in strength is provided by introducing a discontinuous part of a reinforcing fiber substrate into at least one reinforcing fiber substrate layer of any one of said first and second FRP layers.

3. The FRP panel according to claim 2, wherein a plurality of discontinuous parts are provided.

4. The FRP panel according to claim 2, wherein said discontinuous part extends almost straightly.

5. The FRP panel according to claim 1, wherein said high breaking elongation layer comprises a high breaking elongation resin, and said high breaking elongation resin comprises a thermoplastic resin having a low affinity in adhesion with a matrix resin of said FRP layer.

6. The FRP panel according to claim 5, wherein said high breaking elongation layer comprises a thermoplastic resin film.

7. The FRP panel according to claim 5, wherein said high breaking elongation layer comprises a multi-layer laminated film.

8. The FRP panel according to claim 1, wherein said difference in strength is provided by providing a difference in thickness between said first and second FRP layers.

9. The FRP panel according to claim 1, wherein a difference in planar rigidity against external force is provided between said first and second FRP layers by providing a difference in hardness between a surface and a back surface of said core material.

10. An FRP panel for an automobile comprising at least two FRP layers separated from each other with a first of the FRP layers on a first surface side and a second of the FRP layers on a second surface side on an opposite side of the first surface, wherein i) the first of the FRP layers and the second of the FRP layers are formed either (1) as an FRP solid plate formed integrally with the first of the FRP layers and the second of the FRP layers or (2) as a structure which has a space between the first of the FRP layers and the second of the FRP layers and in which the space is left intact or a core material is disposed in the space, ii) either of the first and second FRP layers is formed as a lower-strength FRP layer, and the lower-strength FRP layer forms a crushable structure that absorbs impacts to a pedestrian during a collision, wherein differences in strength are provided by one or two or more differences selected from the group consisting of a difference in amount of reinforcing fibers, a difference in property of reinforcing fibers and a difference in orientation of reinforcing fibers, and iii) each of the FRP layers is formed integrally as an FRP solid plate and said difference in strength is further provided by introducing a discontinuous part of a reinforcing fiber substrate, which is a trigger point for breakage, on at least one reinforcing fiber substrate layer of the lower strength FRP layer.

11. The FRP panel according to claim 10, wherein said difference in strength is provided by providing a difference in thickness between said first and second FRP layers.

12. The FRP panel according to claim 10, wherein a difference in planar rigidity against external force is provided between said first and second FRP layers by providing a difference in hardness between a surface and a back surface of said core material.

* * * * *